(12) United States Patent
Wheelwright

(10) Patent No.: US 11,619,808 B1
(45) Date of Patent: Apr. 4, 2023

(54) DISPLAY AND OPTICAL ASSEMBLY WITH COLOR-SELECTIVE EFFECTIVE FOCAL LENGTH

(71) Applicant: Meta Platforms Technologies, LLC, Menlo Park, CA (US)

(72) Inventor: Brian Wheelwright, Sammamish, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 1031 days.

(21) Appl. No.: 16/203,436

(22) Filed: Nov. 28, 2018

(51) Int. Cl.
| | |
|---|---|
| *G02B 27/01* | (2006.01) |
| *G02B 27/00* | (2006.01) |
| *G02B 5/20* | (2006.01) |
| *G02B 27/28* | (2006.01) |

(52) U.S. Cl.
CPC ......... *G02B 27/0081* (2013.01); *G02B 5/201* (2013.01); *G02B 27/0172* (2013.01); *G02B 27/283* (2013.01)

(58) Field of Classification Search
CPC .................. G02B 5/201; G02B 5/3025; G02B 27/0081; G02B 27/283; G02B 27/286; G02B 27/0172; G02B 27/1006

USPC .................................................... 359/485.01
See application file for complete search history.

(56) References Cited

U.S. PATENT DOCUMENTS

| | | | |
|---|---|---|---|
| 10,466,496 B2 * | 11/2019 | Parsons ................. | G02B 1/002 |
| 10,955,672 B1 * | 3/2021 | Wheelwright ....... | G02B 27/286 |
| 11,378,811 B2 * | 7/2022 | Geng ................... | G02B 5/3025 |
| 2004/0108971 A1 * | 6/2004 | Waldern ............... | G02B 27/017 |
| | | | 345/8 |
| 2014/0266985 A1 * | 9/2014 | Harrison .................. | G09G 3/20 |
| | | | 345/88 |
| 2018/0239146 A1 | 8/2018 | Bierhuizen et al. | |
| 2020/0310121 A1 * | 10/2020 | Choi ........................ | G02B 5/32 |
| 2021/0223548 A1 * | 7/2021 | Maimone ............. | G02B 5/3016 |
| 2021/0389621 A1 * | 12/2021 | Huang ............... | G02B 27/0172 |

\* cited by examiner

*Primary Examiner* — Ricky D Shafer
(74) *Attorney, Agent, or Firm* — Freestone Intellectual Property Law PLLC; Aaron J. Visbeek

(57) ABSTRACT

A head mounted display includes a display and an optical assembly. The display includes first pixel emitting first display light and second pixels emitting second display light. The first display light includes a first light spectrum that is different than a second light spectrum of the second display light. The optical assembly is configured to focus the first display light and the second display light for a user of the HMD. The optical assembly provides a first effective focal length to the first display light and provides a second effective focal length to the second display light.

11 Claims, 15 Drawing Sheets

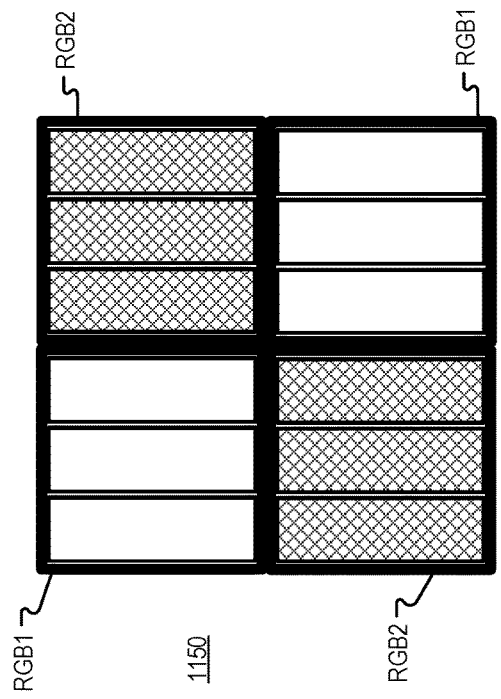
FIG. 11A
FIG. 11B
FIG. 11C

DISPLAY AND OPTICAL ASSEMBLY WITH COLOR-SELECTIVE EFFECTIVE FOCAL LENGTH

TECHNICAL FIELD

This disclosure relates generally to optics, and in particular to optical assemblies.

BACKGROUND INFORMATION

High quality optical assemblies that may include a combination of lenses, filters, and/or polarizers are used extensively in both commercial and consumer products. An optical assembly may be utilized to focus images from a display for a user of a head mounted display (HMD) in the context of Virtual Reality (VR), Augmented Reality (AR), and/or Mixed Reality (MR). When a device that utilizes an optical assembly is powered by a battery, the optical efficiency of the optical assembly may be an important design consideration. In these and other contexts, it may also be desirable to provide high-resolution images with a wide field of view (FOV).

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIGS. 11A-11C illustrate example first and second pixels having red-green-blue (RGB) subpixels and an example arrangement of the first and second pixels, in accordance with an embodiment of the disclosure.

DETAILED DESCRIPTION

Figure 1:
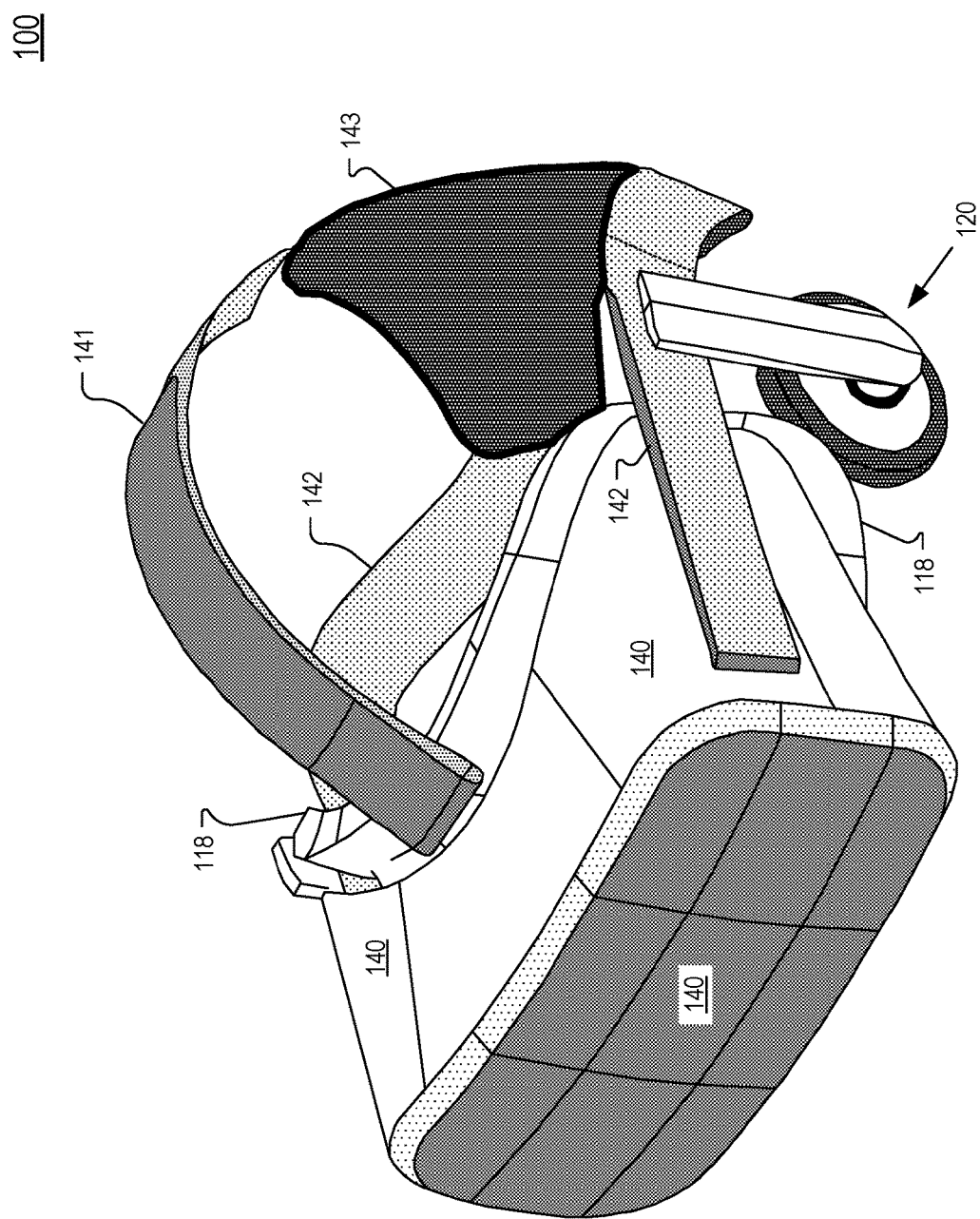
FIG. 1 illustrates an example head mounted display (HMD) that may include a display and an optical assembly with a color-selective effective focal length, in accordance with an embodiment of the disclosure.

Embodiments of a display and an optical assembly with a color-selective effective focal length are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments of the disclosure include a display and optical assembly with a color-selective effective focal length. The disclosed display and optical assembly may be used in a head mounted display (HMD) to provide an increased Field of View (FOV) and present high resolution inset images to a user of the HMD. The color-selective characteristics of the optical assembly may provide increased optical efficiency and therefore require less electrical power for the display.

To facilitate the color-selective effective focal length of the optical assembly, a display may include first pixels emitting first display light having a first light spectrum and second pixels emitting second display light having a second light spectrum. The first pixels may include first red-green-blue subpixels that emit first red band light, first green band light, and first blue band light, respectively. The second pixels may include second red-green-blue subpixels that emit second red band light, second green band light, and second blue band light, respectively. The light bands of the first pixels are different than the second pixels so that the first light spectrum and the second light spectrum "see" different optical elements of the optical assembly to provide the differing effective focal lengths.

At least some optical elements of the optical assembly are color-selective to either the first light spectrum or the second light spectrum. For example, the optical assembly may include a color-selective reflective polarizer (CSRP) configured to reflect the first light spectrum (including the first red-green-blue bands) in a particular polarization orientation but not reflect the second light spectrum. Additionally, one or more color-selective partially reflective layers (CSPRL)

may be configured to selectively reflect either the first light spectrum or the second light spectrum. The one or more CSPRLs may be disposed on a curvature to selectively impart optical power (in reflection) to either the first light spectrum or the second light spectrum and thereby give the first light spectrum a first effective focal length and give the second light spectrum a second effective focal length. These and other embodiments are described below with respect to FIGS. 1-13.

FIG. 1 illustrates an example head mounted display (HMD) 100 that may include a display and an optical assembly with a color-selective effective focal length, in accordance with an embodiment of the disclosure. Example head mounted display (HMD) 100 includes a top structure 141, a rear securing structure 143, and a side structure 142 attached with a viewing structure 140 having a front rigid body 144. The illustrated HMD 100 is configured to be worn on a head of a user of the HMD. In one embodiment, top structure 141 includes a fabric strap that may include elastic. Side structure 142 and rear securing structure 143 may include a fabric as well as rigid structures (e.g. plastics) for securing the HMD to the head of the user. HMD 100 may optionally include earpiece(s) 120 configured to deliver audio to the ear(s) of a wearer of HMD 100.

In the illustrated embodiment, viewing structure 140 includes an interface membrane 118 for contacting a face of a wearer of HMD 100. Interface membrane 118 may function to block out some or all ambient light from reaching the eyes of the wearer of HMD 100.

Example HMD 100 also includes a chassis for supporting hardware of the viewing structure 140 of HMD 100. Hardware of viewing structure 140 may include any of processing logic, wired and/or wireless data interface for sending and receiving data, graphic processors, and one or more memories for storing data and computer-executable instructions. In one embodiment, viewing structure 140 may be configured to receive wired power. In one embodiment, viewing structure 140 is configured to be powered by one or more batteries. In one embodiment, viewing structure 140 may be configured to receive wired data including video data. In one embodiment, viewing structure 140 is configured to receive wireless data including video data.

Viewing structure 140 may include a display for directing image light to a wearer of HMD 100. The display may include an LCD, an organic light emitting diode (OLED) display, or micro-LED display for directing image light to a wearer of HMD 100. In some embodiments, an eye-tracking camera may be included in viewing structure 140 and positioned to capture image(s) of an eye of a user of HMD 100.

Figure 2:
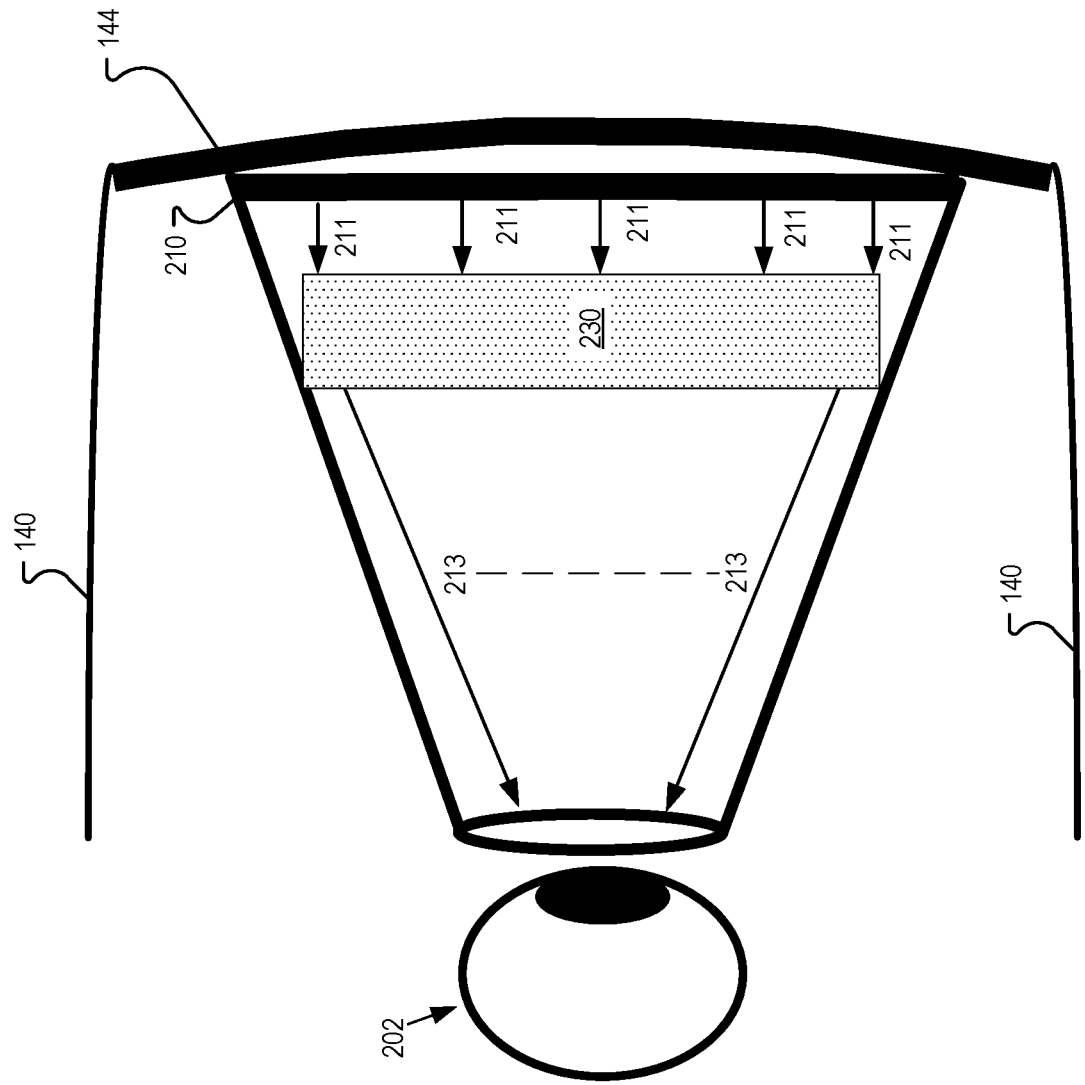
FIG. 2 illustrates a cut away view of an HMD that includes a display and an optical assembly configured to direct display light to an eyebox area, in accordance with an embodiment of the disclosure.

FIG. 2 illustrates a cut away view of an HMD that includes a display 210 and an optical assembly 230 configured to direct display light 211 to an eyebox area, in accordance with an embodiment of the disclosure. Optical assembly 230 is positioned to receive the display light 211 and direct the display light 211 to eye 202 as image light 213. Optical assembly 230 may be configured to allow eye 202 of a wearer of HMD 100 to focus on a virtual image displayed by display 210. Although FIG. 2 only illustrates one eye 202, an HMD may have a display 210 (or a portion of a shared display) and an optical assembly 230 for each eye of the user of the HMD.

As described briefly above, the display 210 may include a display pixel array having first pixels emitting first display light having a first light spectrum and second pixels emitting second display light having a second light spectrum. In one embodiment, the first pixels may include first red-green-blue (RGB) subpixels that emit first red band light, first green band light, and first blue band light, respectively. FIG. 11A illustrates an RGB1 1110 pixel that includes a red subpixel R1 1111, a green subpixel G1 1112, and a blue subpixel B1 1113, for example. The second pixels may include second RGB subpixels that emit second red band light, second green band light, and second blue band light, respectively. FIG. 11B illustrates an RGB2 1120 pixel that includes a red subpixel R2 1121, a green subpixel G2 1122, and a blue subpixel B2 1123, for example. The first red band light is different than the second red band light, the first green band light is different than the second green band light, and the first blue band light is different than the second blue band light, in this embodiment.

Figure 3:
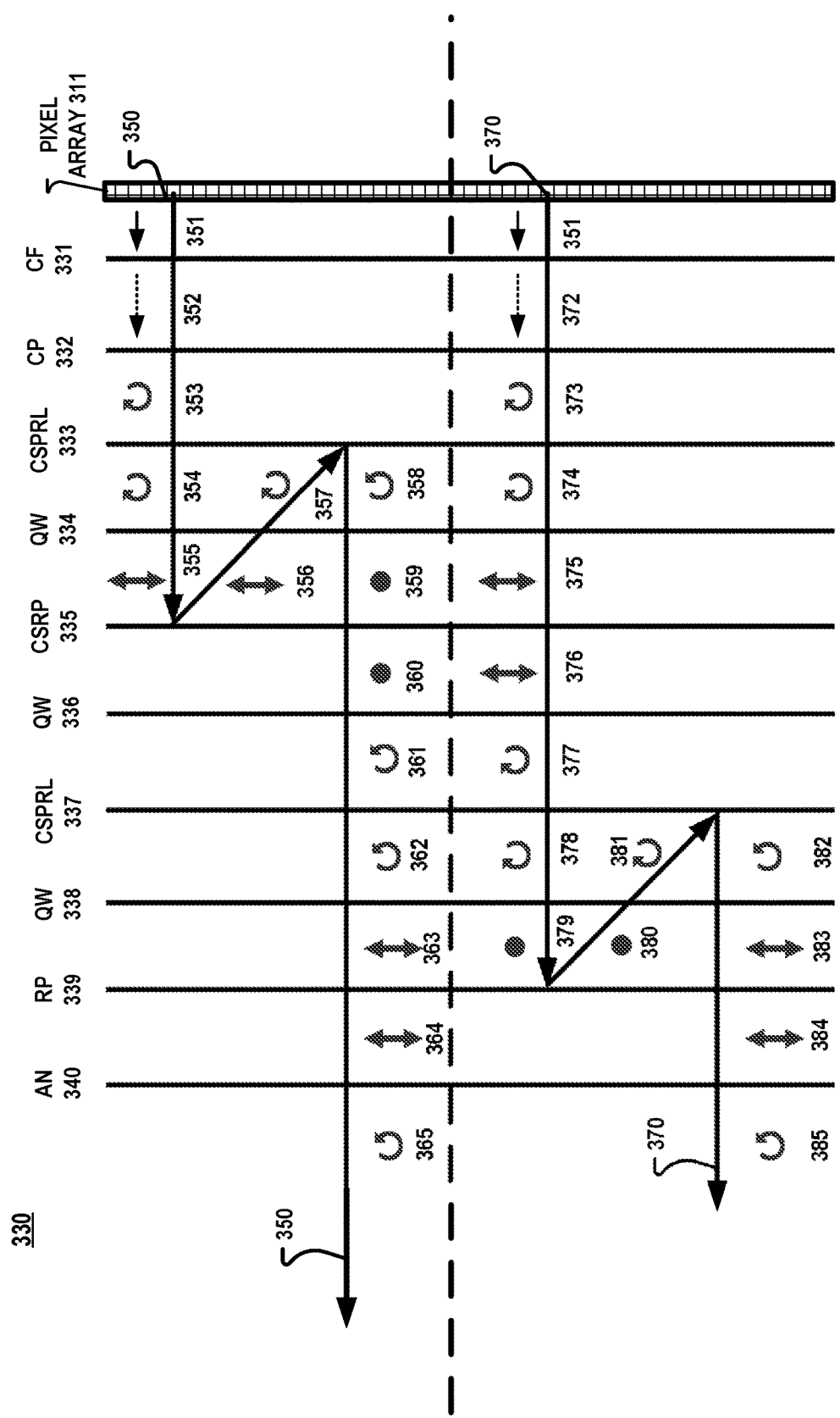
FIG. 3 illustrates an example optical assembly and different optical paths taken by first display light and second display light, in accordance with an embodiment of the disclosure.

FIG. 3 illustrates an example optical assembly 330 and the different optical paths taken by the first display light and the second display light, in accordance with an embodiment of the disclosure. The optical elements included in example optical assembly 330 include a color filter array 331, a circular polarizer 332, a color-selective partially reflective layer 333, a quarter-waveplate 334, a color-selective reflective polarizer 335, a quarter-waveplate 336, a color-selective partially reflective layer 337, a quarter-waveplate 338, a reflective polarizer 339, and an optional anti-narcissus layer 340. Display 210 may include display pixel array 311, color filter array 331, and circular polarizer 332, in some embodiments.

In operation, display pixel array 311 emits display light 351 for presenting one or more images to a viewer. Display light 351 is emitted by display pixel array 311 and encounters color filter array layer 331 which generates first display light 352 having a first light spectrum and second display light 372 having a second light spectrum different than the first light spectrum. Color filter array 331 may be a two-dimensional layer having color filters disposed over each pixel or subpixel of display pixel array 311. Optical path 350 represents the optical path of the first light spectrum of first display light 352 through optical assembly 330 and optical path 370 represents the optical path of the second light spectrum of second display light 372 through optical assembly 330. Optical path 350 corresponds with a first effective focal length of the optical assembly 330 and optical path 370 corresponds with a second effective focal length of optical assembly 330.

Figure 4:
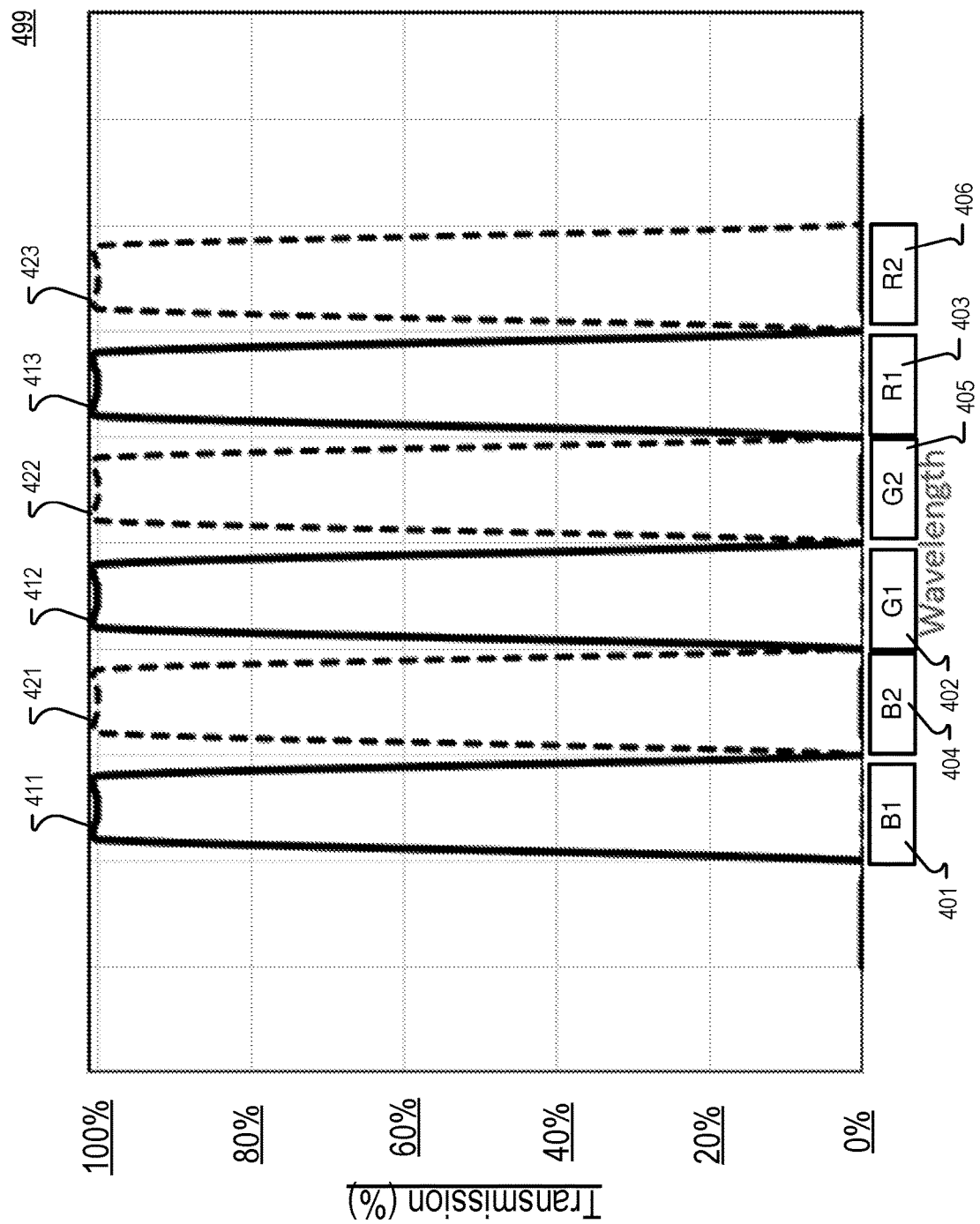
FIG. 4 illustrates a chart of example color bands that may be transmitted by example color filters, in accordance with an embodiment of the disclosure.

FIG. 4 illustrates a chart 499 of example color bands that may be transmitted by example color filters, in accordance with embodiments of the disclosure. In some embodiments, color filter array 331 may include six different color filters that includes a first red color filter 401 passing first red band 411, a first green color filter 402 passing first green band 412, a first blue color filter 403 passing first blue band 413, a second red color filter 404 passing second red band 421, a second green color filter 405 passing second green band 422, and a second blue color filter 406 passing second blue band 423. Each color filter may pass a relatively narrow band (e.g. 10 nm) of display light and reject other visible wavelengths when illuminated by white light, for example. FIG. 4 illustrates that each color filter transmits a very high percentage (e.g. approaching 100%) of the light within the transmission band of the particular color filter and rejects (blocks) wavelengths outside the transmission band. Although the transmission bands are illustrated as beside each other, there may be significant spacing between the blue and green bands and the green and red bands, for example. In FIG. 4, the solid line illustrates example bands from an example RGB1 pixel such as RGB1 1110 in FIG.

11A and the dashed line illustrates example bands from an example RGB2 pixel such as RGB2 1120 in FIG. 11B.

Referring back to FIG. 3, display light 351 propagating along optical path 350 encounters color filter array 331 which generates first display light 352 having a first light spectrum. The first light spectrum may include bands 411, 412, and 413 from first pixels (e.g. pixels configured as RGB1 1110) in the display pixel array 311. First display light 352 encounters circular polarizer 332 and circular polarizer 332 passes the first display light 352 as right-hand circularly polarized light 353, in the illustrated embodiment. Right-hand circularly polarized light 353 encounters color-selective partially reflective layer (CSPRL) 333. A percentage of light 353 is either blocked or reflected by CSPRL (not illustrated) and the remaining percentage continues propagating along optical path 350 as light 354, still retaining its right-hand circularly polarized orientation.

Figure 5:
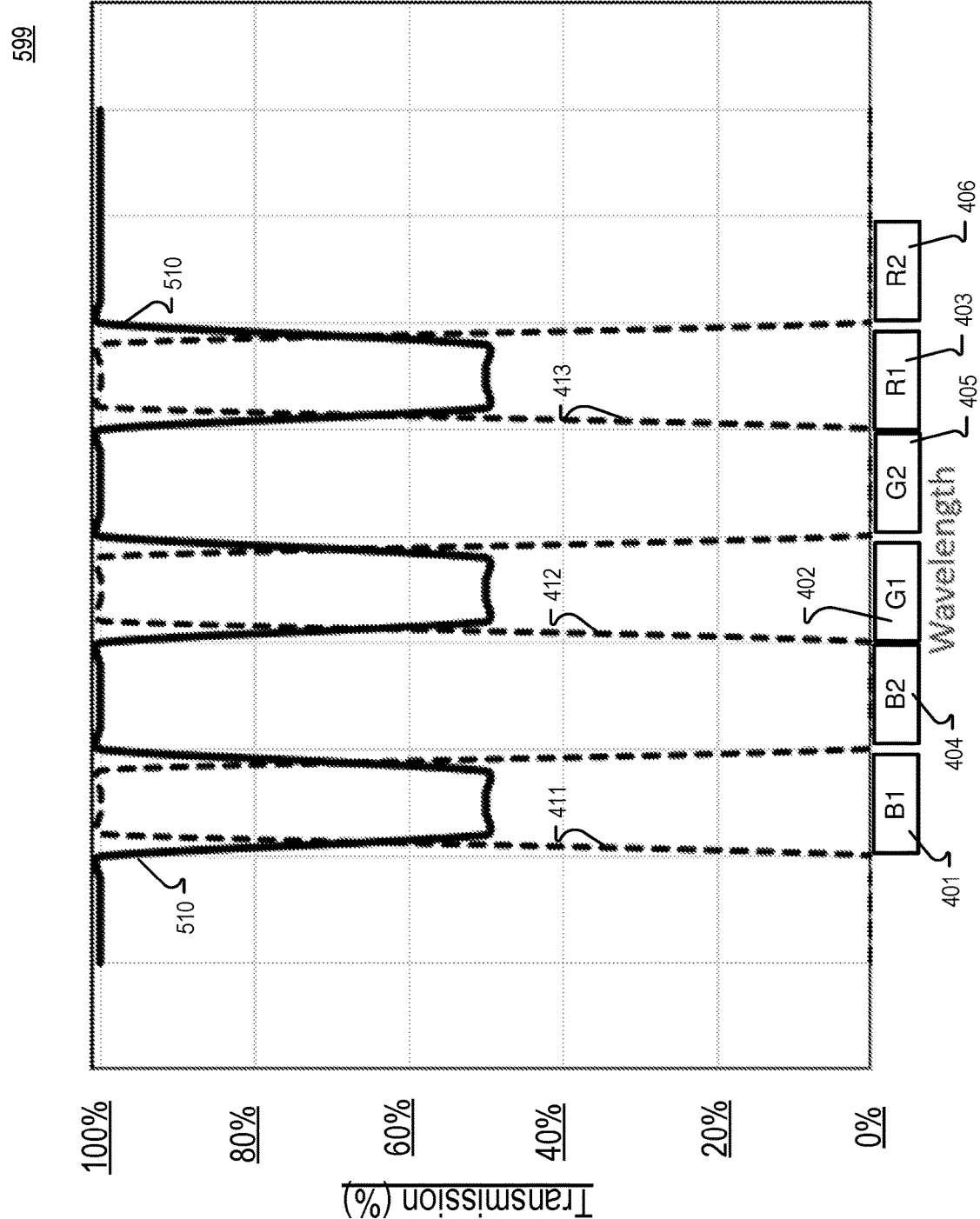
FIG. 5 illustrates an example chart illustrating an example transmission profile of a color-selective partially reflective layer, in accordance with an embodiment of the disclosure.

FIG. 5 illustrates an example chart 599 illustrating an example transmission profile of CSPRL 333, in accordance with embodiments of the disclosure. FIG. 5 shows that the CSPRL 333 transmits a percentage (e.g. 50%) of the first light spectrum. In the particular example illustrated in example chart 599, CSPRL 333 transmits approximately 50% of the first red band 411, approximately 50% of the first green band 412, and approximately 50% of the first blue band 413. Notably, the notches in the filter of CSPRL 333 are aligned with the bands 411, 412, and 413 so a percentage of those bands are reflected while second display light 372 having the second light spectrum (e.g. bands 421, 422, and 423) is fully transmitted by CSPRL 333. CSPRL 333 may include a multi-layer dielectric film to achieve the transmission signature 510 illustrated in FIG. 5.

Returning to FIG. 3, the percentage of light 353 that is passed by CSPRL 333 continues as right-hand circularly polarized light 354 and encounters quarter-waveplate 334. Quarter-waveplate 334 is configured to convert incident right-hand circularly polarized light 354 into linearly polarized light 355. In the illustrated embodiment, quarter-waveplate 334 is oriented with its fast axis at 135° such that the outputted linearly polarized light 355 is vertically oriented. Linearly polarized light 355 encounters color-selective reflective polarizer (CSRP) 335 and is reflected as linearly polarized light 356. In the illustrated embodiment, CSRP 335 is configured to reflect the first light spectrum of the first display light when the first display light is oriented in a first linear polarization orientation (e.g. vertically oriented linearly polarized light) and pass the first display light when the first display light is oriented in a second linear polarization orientation (e.g. horizontally oriented linearly polarized light) that is orthogonal to the first linear polarization orientation. CSRP 335 is also configured to pass the second light spectrum of the second display light when the second display light is in the first linear polarization orientation and the second linear polarization orientation.

Figure 6A:
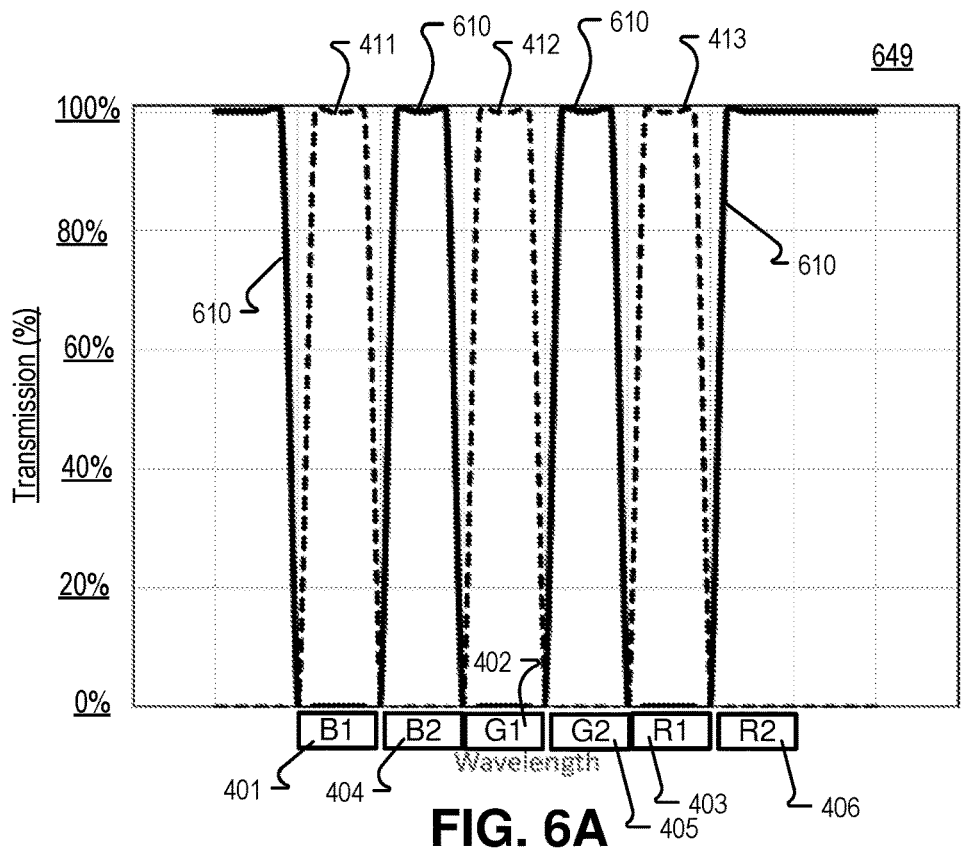
FIGS. 6A-6B illustrate charts of example transmission/reflection profiles of a color-selective reflective polarizer for different polarization orientations, in accordance with an embodiment of the disclosure.
Figure 6B:
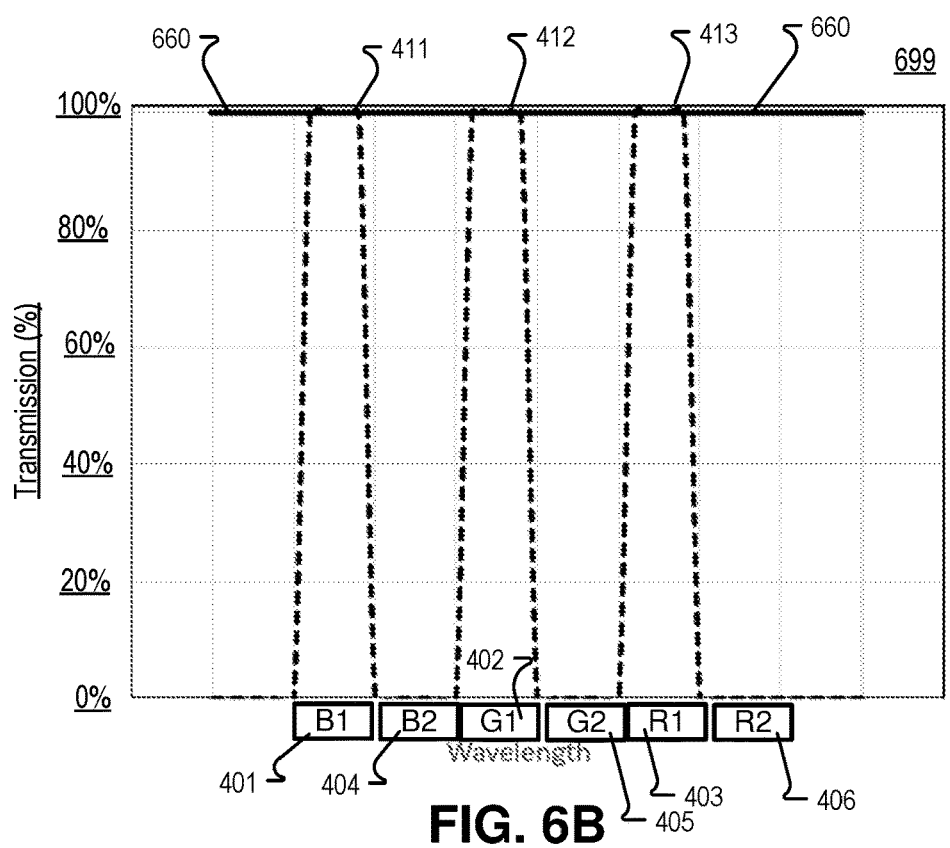

FIG. 6A illustrates a chart 649 of an example transmission/reflection profile 610 of CSRP 335 for a first polarization orientation (e.g. vertically oriented linearly polarized light) and FIG. 6B illustrates a chart 699 of an example transmission/reflection profile 660 of CSRP for a second polarization orientation (e.g. horizontally linearly polarized light) that is orthogonal to the first polarization orientation. In FIG. 6A, the solid line illustrates a transmission/reflection profile 610 where the first red band 411, the first green band 412, and the first blue band 413 are reflected by CSRP 335 when they have the first linear polarization orientation. The second light spectrum (e.g. bands 421, 422, and 423) of the second display light (not specifically illustrated) in FIG. 6A is not aligned with the reflecting notches of profile 610 and the second light spectrum is passed by CSRP 335 when the second light spectrum has the first linear polarization orientation.

In FIG. 6B, chart 699 includes a transmission/reflection profile 660 showing that both the first light spectrum (illustrated as bands 411, 412, and 413) and the second light spectrum are transmitted by CSRP 335 when the light is oriented in the second linear polarization orientation. A color-selective reflective polarizer such as CSRP 335 may be a birefringent film fabricated by the 3M Company of Maplewood, Minnesota, for example.

Referring again to FIG. 3, light 355 is reflected by CSRP 335 as vertically oriented linearly polarized light 356 since CSRP 335 is configured to reflect the first light spectrum of first display light when the first display light is vertically oriented linearly polarized light. Light 356 encounters quarter-waveplate 334 and is converted to right-hand circularly polarized light 357. A percentage (e.g. 50%) of light 357 is either absorbed or transmitted by CSPRL 333 (not illustrated) while the remaining percentage is reflected by CSPRL 333 since light 357 is in the first light spectrum and therefore partially reflected by CSPRL 333. The reflected percentage of light 357 is reflected by CSPRL 333 as left-hand circularly polarized light 358. Quarter-waveplate 334 receives light 358 and converts it to linearly polarized light 359, illustrated as horizontally-polarized in the illustrated example of FIG. 3. Since CSRP 335 is configured to pass the first light spectrum of the first display light when oriented in the second linear polarization orientation (e.g. horizontally polarized light in the example of FIG. 3), light 359 passes through CSRP 335 as horizontally oriented linearly polarized light 360.

Horizontally oriented linearly polarized light 360 encounters quarter-waveplate 336 and quarter-waveplate 336 converts light 360 to left-hand circularly polarized light 361, in FIG. 3. Propagating along optical path 350, light 361 encounters a second color selective partially reflective layer (CSPRL 337).

Figure 7:
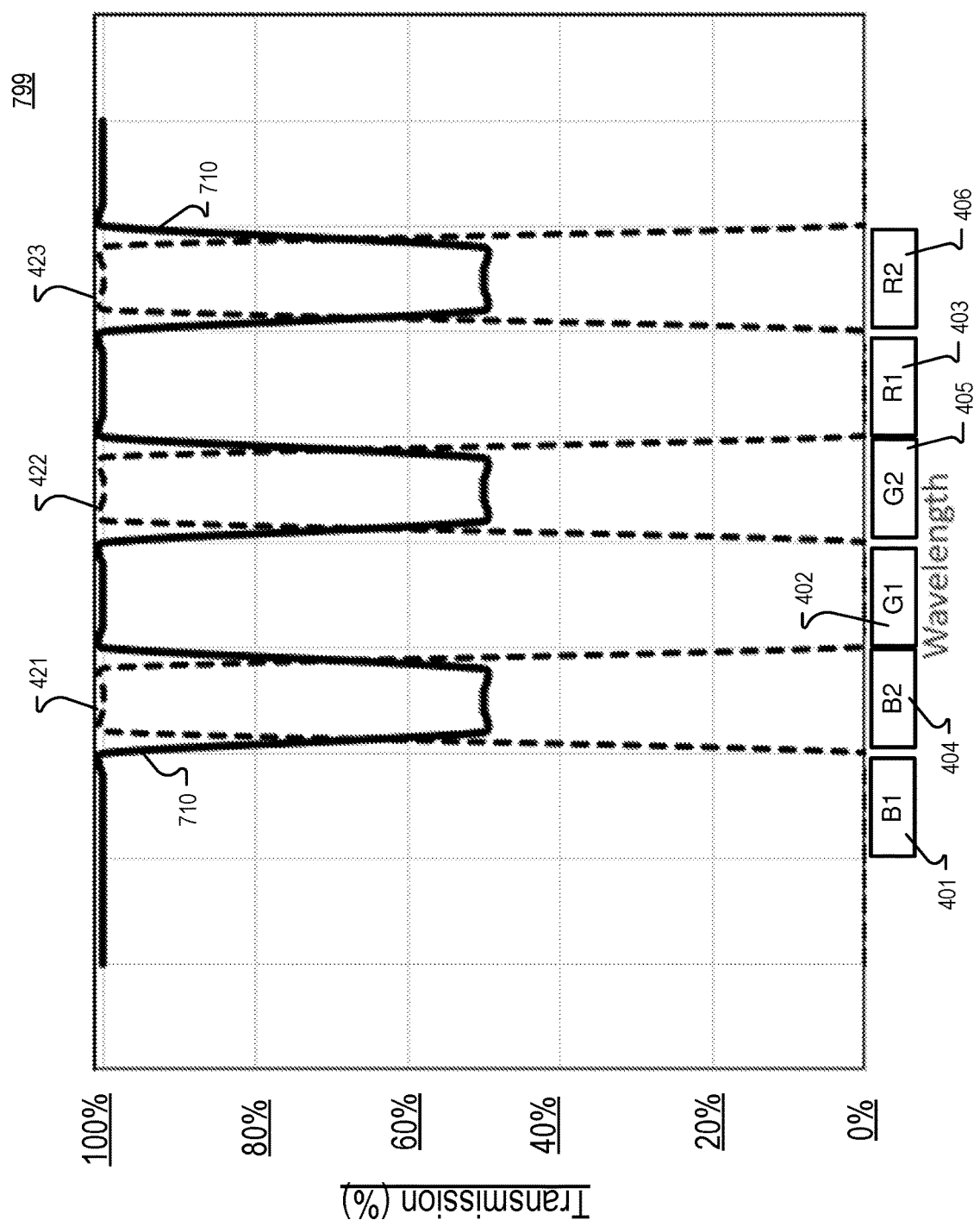
FIG. 7 illustrates a chart including a transmission/reflection profile of a second color-selective partially reflective layer, in accordance with an embodiment of the disclosure.

FIG. 7 illustrates a chart 799 including a transmission/reflection profile 710 showing that the first light spectrum of first display light (e.g. bands 411, 412, 413) is transmitted by second CSPRL 337 and the second light spectrum (e.g. bands 421, 422, and 423 in the example of FIG. 7) is partially reflected. In FIG. 7, approximately 50% of the second light spectrum is reflected by CSPRL 337 while the remaining percentage is transmitted.

Since second CSPRL 337 passes the first light spectrum, light 361 passes through CSPRL 337 with very little (if any) loss as left-hand circularly polarized light 362. Left-hand circularly polarized light 362 is converted to vertically oriented linearly polarized light 363 by quarter-waveplate 338 and passes through reflective polarizer 339 since reflective polarizer 339 is configured to pass vertically oriented linearly polarized light and reflect horizontally oriented linearly polarized light, in FIG. 3. Vertically oriented linearly polarized light 364 may optionally be converted to circularly polarized light 365 by anti-narcissus layer 340. By including the optional anti-narcissus layer 340, an HMD user is less likely to see reflections of her own eye from light 365 reflecting off the eye of the user and again reflecting off one or more of the layers illustrated in FIG. 3 since anti-narcissus layer 340 may include a polarizer that absorbs horizontally linearly polarized light.

Turning now to optical path 370 of FIG. 3, display 310 emits display light 371 that encounters color filter array 331. Color filter array 331 generates second display light 372 having a second light spectrum. The second display light having the second light spectrum may be generated by second pixels that are overlaid by color filters in the color filter array 331 that transmit the second light spectrum. The second light spectrum may include bands 421, 422, and 423 from second pixels (e.g. pixels configured as RGB2 1120) in the display pixel array 311. Second display light 372 encounters circular polarizer 332 and circular polarizer 332 passes the second display light 372 as right-hand circularly polarized light 373, in the illustrated embodiment. Right-hand circularly polarized light 373 encounters CSPRL 333. Since CSPRL 333 is configured to transmit the second light spectrum, light 373 is transmitted by CSPRL 333 as light 374, still retaining its right-hand circularly polarized orientation. Light 374 encounters quarter-waveplate 334 and quarter-waveplate 334 converts incident right-hand circularly polarized light 374 into vertically oriented linearly polarized light 375. Since CSRP 335 is configured to transmit light that is vertically oriented linearly polarized light (and any light in the second light spectrum regardless of its polarization orientation), light 375 is transmitted by CSRP 335 as light 376, retaining its vertically oriented linearly polarization orientation. Quarter-waveplate 336 receives light 376 and converts it to right-hand circularly polarized light 377.

A percentage of light 377 that encounters second CSPRL 337 is reflected (not illustrated) and lost since CSPRL 337 is configured to reflect a percentage of the second light spectrum. A remaining percentage of light 377 that is not reflected by CSPRL 337 is transmitted by CSPRL 337 as light 378. Right-hand circularly polarized light 378 is converted to horizontally oriented linearly polarized light 379 by quarter-waveplate 338 and reflected by reflective polarizer 339 as light 380 since reflective polarizer 339 is configured to reflect horizontally oriented linearly polarized light (and pass vertically oriented linearly polarized light). Light 380 is converted to right-hand circularly polarized light 381 by quarter-waveplate 338. A percentage of light 381 that encounters second CSPRL 337 is transmitted (not illustrated) by CSPRL 337 while a remaining percentage is reflected since CSPRL 337 is configured to reflect a percentage of the second light spectrum. The reflected percentage of light 381 that is reflected by CSPRL 337 is reflected as left-hand circularly polarized light 382.

Light 382 encounters quarter-waveplate 338 and quarter-waveplate 338 converts light 382 into vertically oriented linearly polarized light 383. Light 383 is passed by reflective polarizer 339 as light 384 since reflective polarizer 339 is configured to pass vertically oriented linearly polarized light and reflect horizontally oriented linearly polarized light. Vertically oriented linearly polarized light 384 may optionally be converted to circularly polarized light 385 by anti-narcissus layer 340.

Optical assembly 330 may provide an increased image brightness and corresponding power savings over prior optical assemblies with more than one effective focal length. First display light 352 propagating along optical path 350 does encounter a significant optical loss (e.g. 50%) both times it encounters CSPRL 333 and second display light 372 propagating along optical path 370 encounters significant optical loss (e.g. 50%) both times it encounters CSPRL 337. However, optical paths in prior solutions encounter significant optical losses at more than two locations as the display light propagates in an optical assembly and therefore, optical assembly 330 may provide a significant optical efficiency advantage over prior optical assembly solutions.

While FIG. 3 is discussed as including a color filter array layer 331, in some embodiments, display pixel array 311 may not require a color filter layer, but instead have organic LEDs or micro LEDs in a display pixel array that are selected according to their emission bands such that first pixels of the display pixel array emit bands 411, 412, and 413, while second pixels of the display pixel array emit bands 421, 422, and 423.

In another embodiment, display pixel array 311 may include standard RGB color filters. For example, the blue band includes both B1 and B2, the green band includes both G1 and G2, etc. In such an embodiment, pixel array 311 would be LCD pixels backlit with a backlight (not illustrated) which changes spectrum time sequentially. For example, in one frame the backlight would illuminate the LCD pixels with a narrow RGB spectrum corresponding to 411, 412, and 413. In the next frame, the backlight would illuminate the LCD with a narrow RGB spectrum corresponding to 421, 422, and 423. By driving at a sufficiently high frequency, human persistence of vision blends the two images together without perceiving flicker. The driving frequency may be between 140 Hz and 200 Hz, corresponding to individual spectrum frequencies between 70 Hz and 100 Hz, respectively. This allows utilization of every LCD pixel in every frame.

In yet another embodiment, display pixel array 311 may have no color filter. In such an embodiment, pixel array 311 would be LCD pixels backlit with a backlight (not illustrated) which changes spectrum time sequentially one color at a time. For example, in one frame the backlight would illuminate the LCD pixels with a first narrow blue spectrum corresponding to 411. In the next frame, the backlight would illuminate the LCD with a second narrow blue spectrum 421. In the third frame, the backlight would illuminate the LCD with a first narrow green spectrum corresponding to 412. In the fourth frame, the backlight would illuminate the LCD with a second narrow green spectrum corresponding to 422. In the fifth frame, the backlight would illuminate the LCD with a first narrow red spectrum corresponding to 413. In the sixth frame, the backlight would illuminate the LCD with a second narrow red spectrum corresponding to 423. By driving at a sufficiently high frequency, human persistence of vision blends the six color images together without perceiving flicker. The driving frequency may be between 360 Hz and 540 Hz, corresponding to individual color flicker between 60 Hz and 90 Hz, respectively. Since every subpixel can produce each color, this embodiment is capable of higher effective resolution.

Figure 8A:
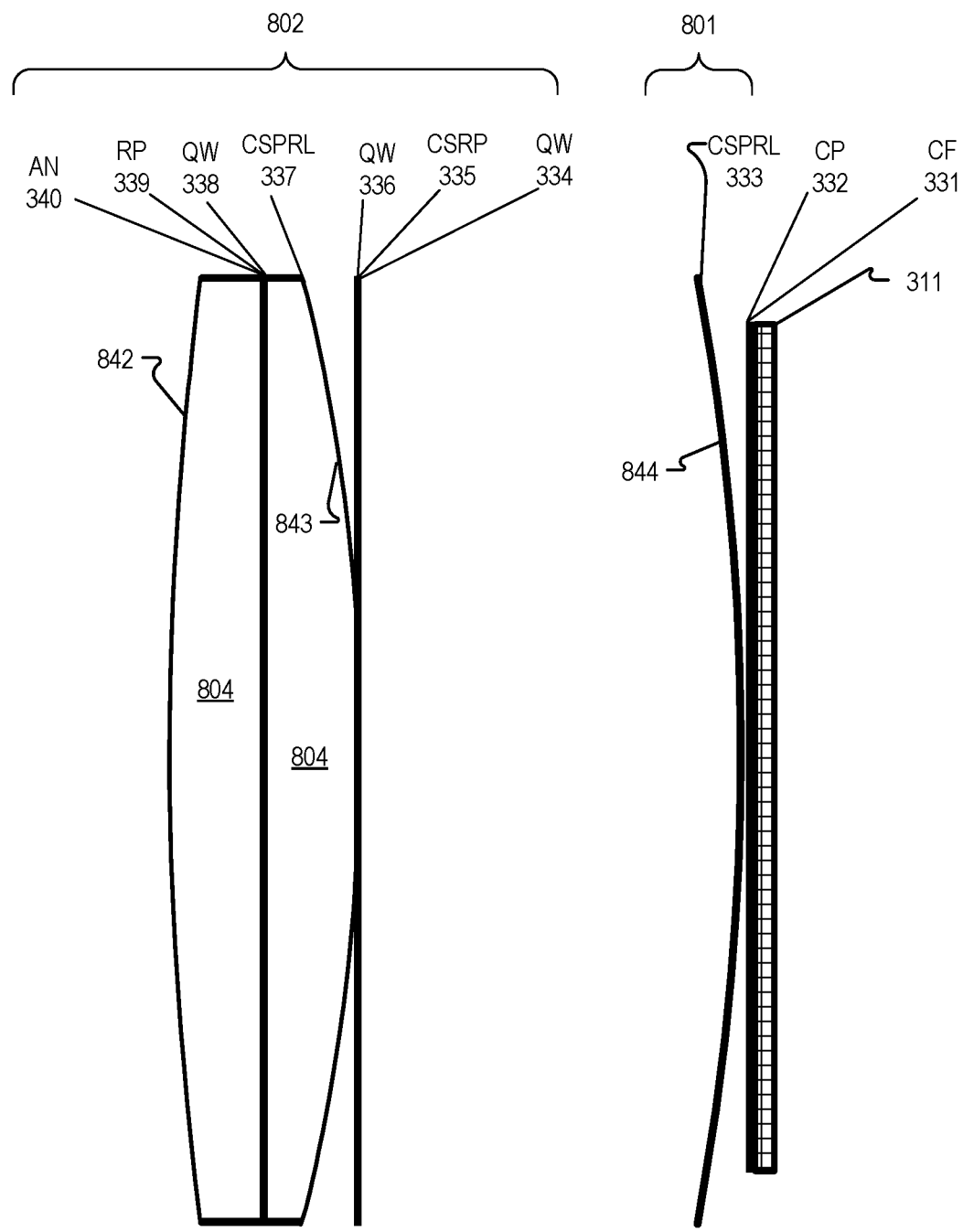
FIGS. 8A-8C illustrate reflective optical elements disposed on curved surfaces that impart different optical power (and corresponding effective focal lengths) to the first and second light spectrums, in accordance with an embodiment of the disclosure.
Figure 8B:
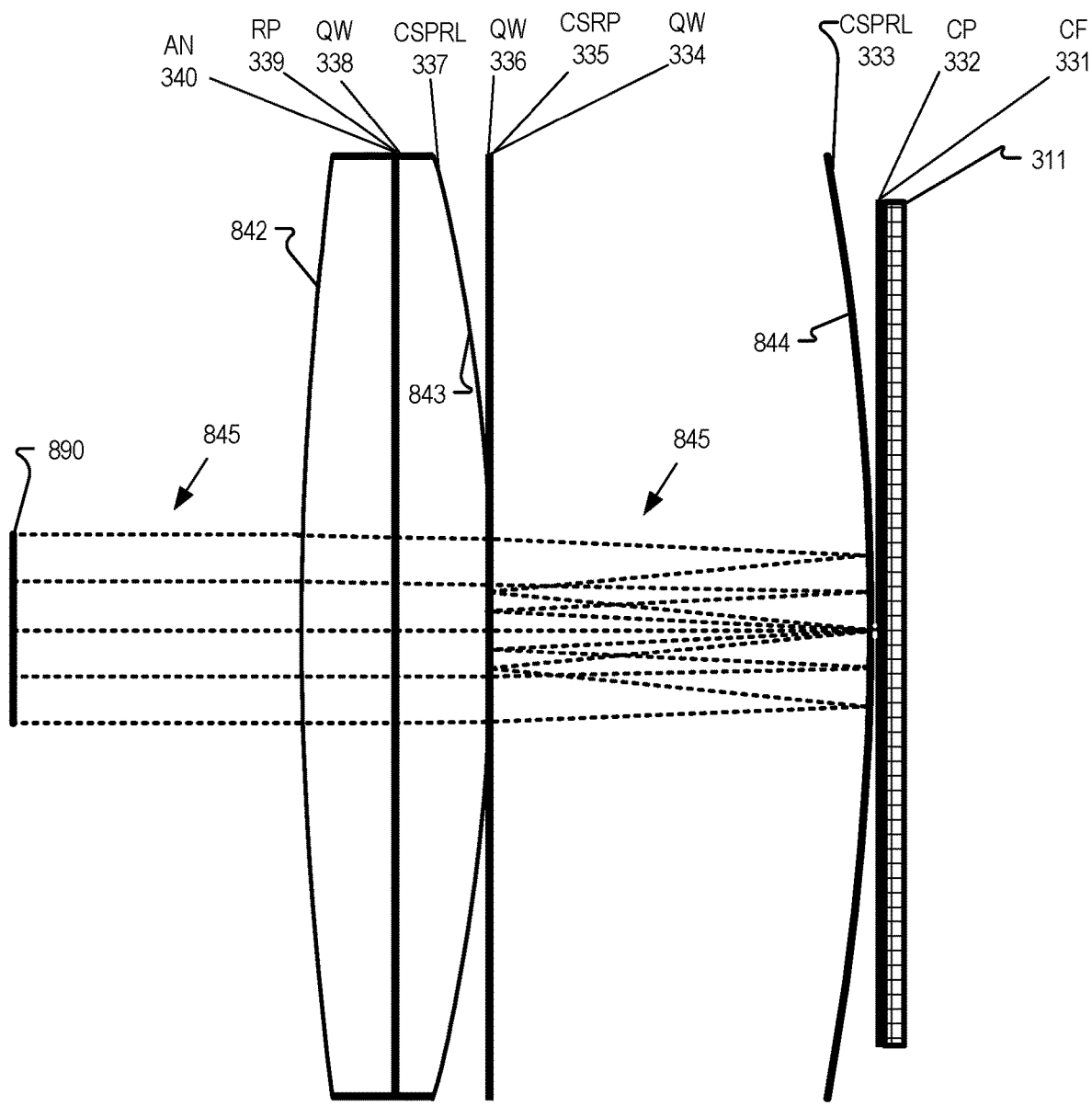
Figure 8C:
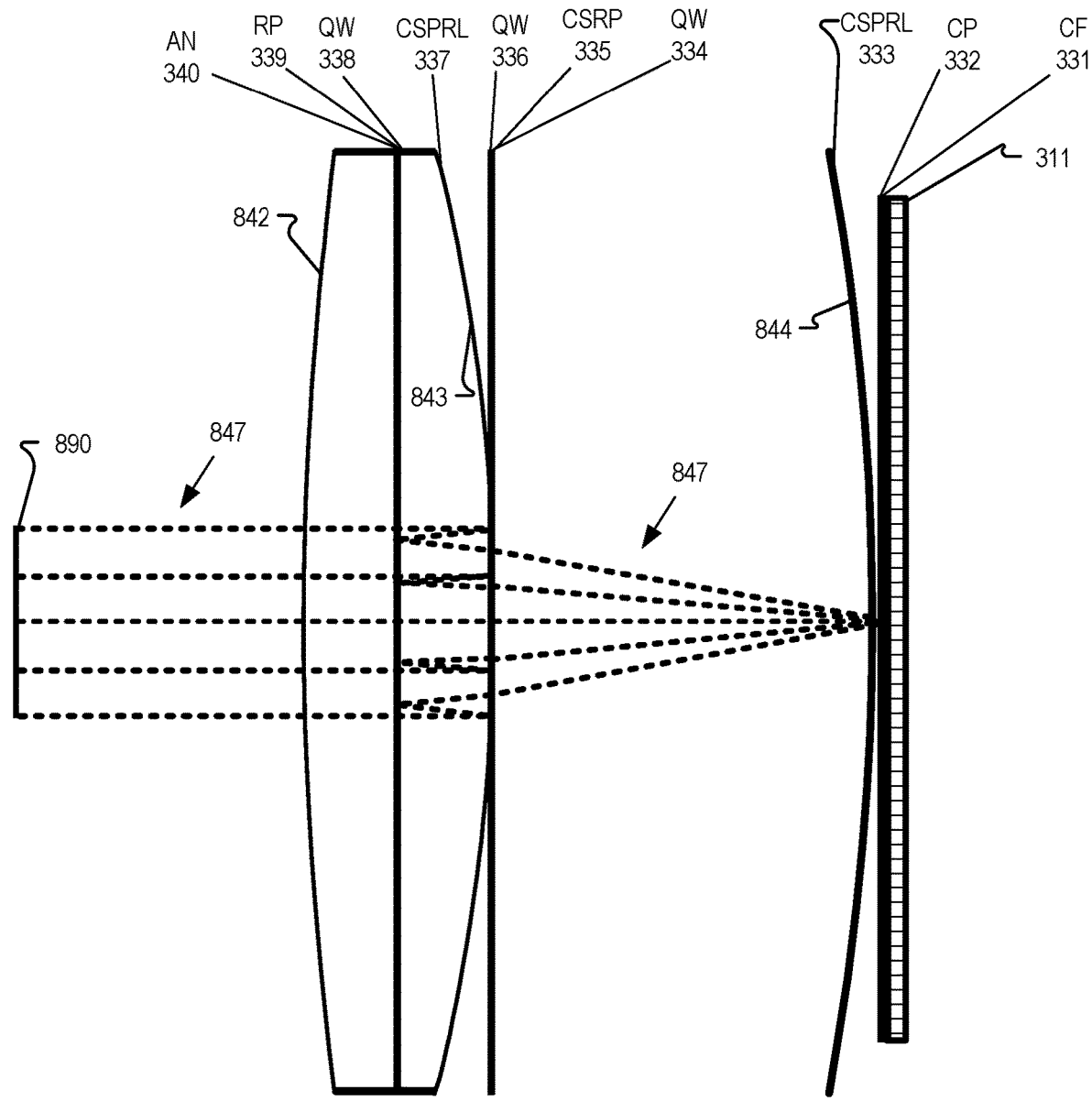

FIGS. 8A-8C illustrate reflective optical elements disposed on curves that impart different optical power (and corresponding effective focal lengths) to the first and second light spectrums, in accordance with embodiments of the disclosure.

FIG. 8A illustrates CSPRL 333 disposed on curved surface 844 and CSPRL 337 is disposed on a second curved surface 844. Curved surface 844 may be supported by a refractive material (not illustrated) of optical element 801 and CSPRL 333 may be disposed on the curved surface. Example optical element 802 may include one or more refractive materials 804 to support curved surface 843. Optical element 802 may also provide an additional curved surface 842 that imparts optical power to display light propagating along optical path 350 and optical path 370. Display pixel array 311, color filter array 331, and circular polarizer 332 may be packaged as a display. The spacing of optical element 801 with respect to optical element 802 may vary the optical power of optical paths in optical assembly 830.

FIG. 8B illustrates that CSPRL 333 disposed on curved surface 844 provides optical power in reflection for the first light spectrum of first display light, as shown by rays 845. FIG. 8C illustrates that the second CSPRL 337 disposed on curved surface 843 provides optical power in reflection for the second light spectrum of second display light, as shown by rays 847. Rays 845 and 847 are shown as focusing display light in an eyebox area 890 for a user of an HMD.

The effective focal length of optical assembly 830 may be a combination of the optical power provided by curved surface 844 and 842 (for the first light spectrum of first display light) or a combination of the optical power provided by curved surface 842 and 843 (for the second light spectrum of second display light). In some embodiments, optical element 802 does not include a curved surface 842. In some embodiment, optical element 802 includes a Fresnel lens that imparts optical power. In an embodiment, the effective focal length of optical assembly 830 illustrated in FIG. 8B is approximately 50 mm. The effective focal length of optical assembly 830 illustrated in FIG. 8C may be approximately 27 mm. Other effective focal lengths are also possible. Example optical assembly 830 provided a color-selective effective focal length since the effective focal length of the optical assembly 830 is dependent on the wavelength of light propagating through the optical assembly.

Figure 9:
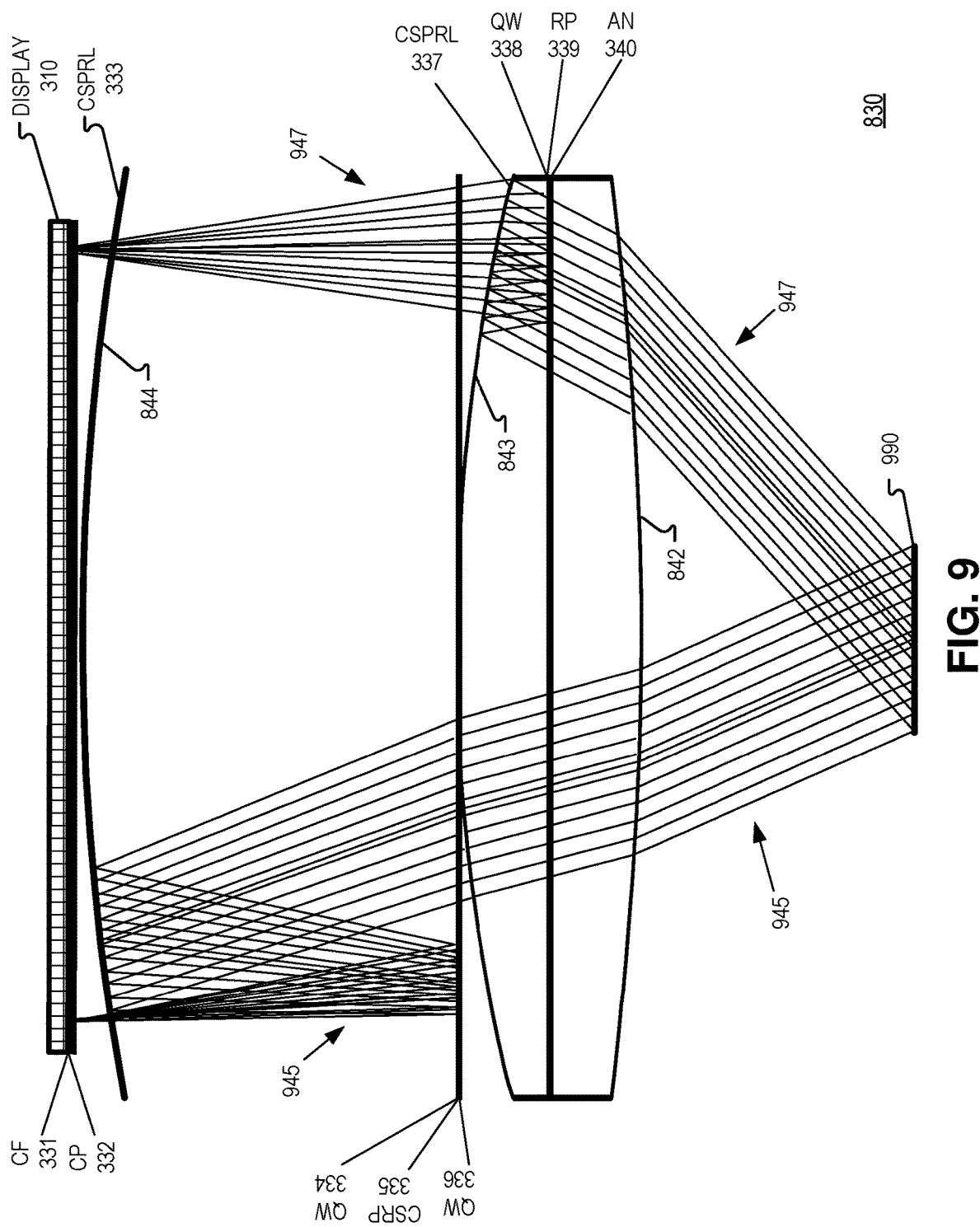
FIG. 9 illustrates additional ray paths which are the off-axis versions of ray paths illustrated in FIGS. 8B-8C, in accordance with embodiments of the disclosure.

FIG. 9 illustrates additional ray paths 945 and 947 which are the off-axis versions of ray paths 845 and 847, respectively, that reach eyebox area 990, in accordance with embodiments of the disclosure. Rays 945 correspond to the effective focal length illustrated by rays 845 and rays 947 correspond to the effective focal length illustrated by rays 847.

Figure 10:
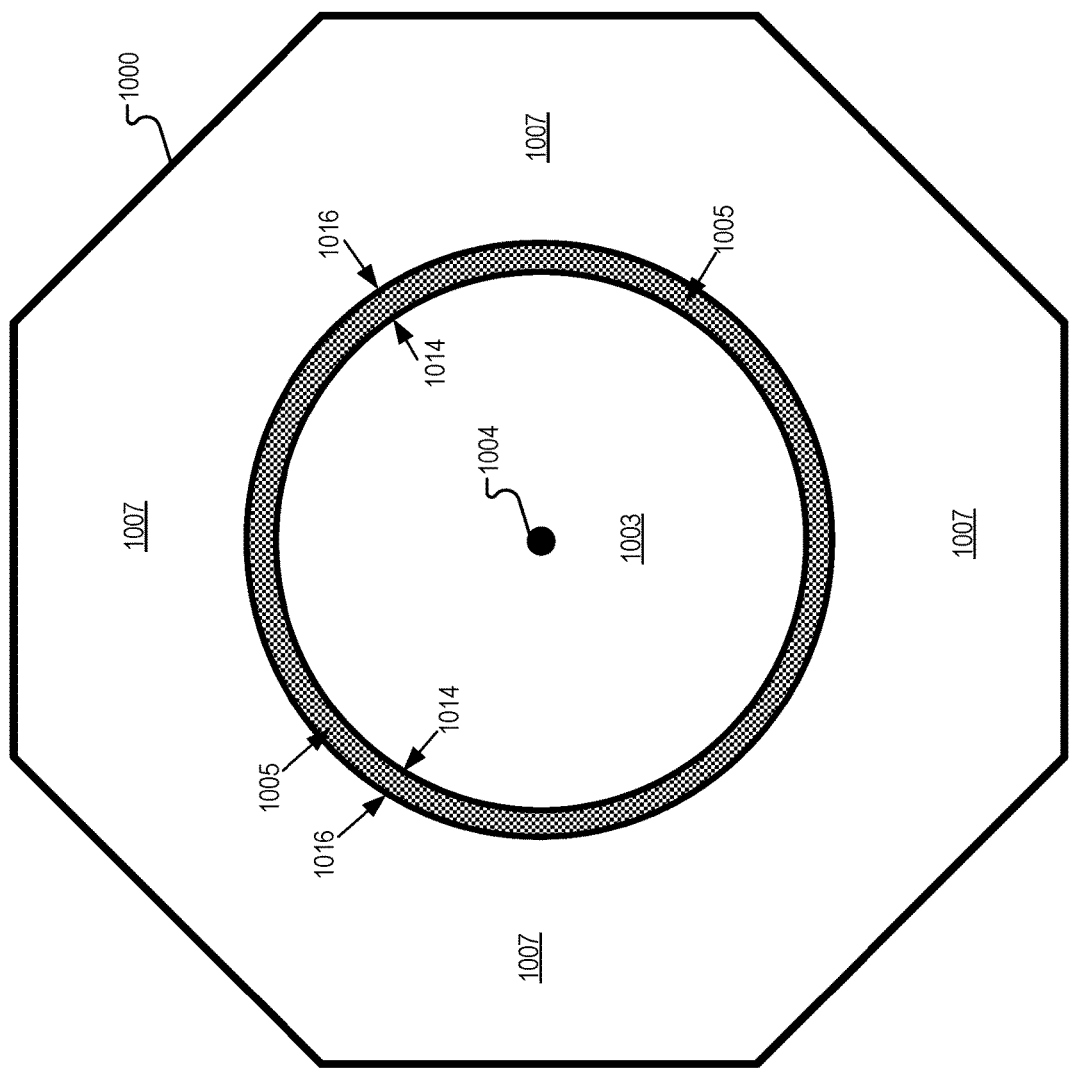
FIG. 10 illustrates an example display having first pixels emitting first display light and second pixels emitting second display light, in accordance with embodiments of the disclosure.

FIG. 10 illustrates an example display 1000 having first pixels emitting first display light and second pixels emitting second display light, in accordance with embodiments of the disclosure. Example display 1000 is shaped as an octagon, but other display shapes (e.g. rectangular) may also be used. Example display 1000 includes a first illumination zone 1003 populated by first pixels that emit first display light having the first light spectrum. A second illumination zone 1007 of display 1000 is populated by first pixels emitting the first display light having the first light spectrum and populated by second pixels that emit second display light having the second light spectrum. The first illumination zone 1003 may be elliptical or circular, as illustrated in FIG. 10. The second illumination zone 1007 surrounds the first illumination zone 1003, in the illustrated embodiment. First illumination zone 1003 may be populated with 100% of the first pixels while second illumination zone 1007 may be populated with 50% of the first pixels and 50% of the second pixels.

In the illustrated embodiment of FIG. 10, example display 1000 includes an optional transition illumination zone 1005 disposed between the first illumination zone 1003 and the second illumination zone 1007. A density of the second pixels in the transition illumination zone 1005 may increase as a distance from a center 1004 of the first illumination zone 1003 increases. In one embodiment, the density of second pixels at an inner edge 1014 of the transition illumination zone 1005 is 0% and the density of the second pixels at the outer edge 1016 of the transition illumination zone is 50%. The density of the second pixels in transition illumination zone 1005 may progressively increase from 0% to 50% to facilitate a graceful blending of images presented by the first pixels and the second pixels so that a combined image that includes images from the first display pixels and the second display pixels does not have a noticeable seam to a user of the HMD.

FIG. 11A illustrates an example first pixel 1110 (also referred to as "RGB1") that includes first red-green-blue (RGB) subpixels. RGB1 1110 is an example first pixel that emits first display light having the first light spectrum. The first red subpixel is R1 1111, the first green subpixel is G1 1112, and the first blue subpixel is B1 1113. Subpixel R1 1111 may emit the first red band 411, subpixel G1 1112 may emit the first green band 412, and subpixel B1 1113 may emit the first blue band 413. In some embodiments, RGB1 1110 may include liquid crystal subpixels with color filters (e.g. 401, 402, and 403) disposed over each liquid crystal subpixel.

FIG. 11B illustrates an example second pixel 1120 (also referred to as "RGB2") that includes second red-green-blue (RGB) subpixels. RGB2 1120 is an example second pixel that emits second display light having the second light spectrum. The second red subpixel is R2 1121, the second green subpixel is G2 1122, and the second blue subpixel is B2 1123. Subpixel R2 1121 may emit the second red band 421, subpixel G2 1122 may emit the second green band 422, and subpixel B2 1123 may emit the second blue band 423. In some embodiments, RGB2 1120 may include liquid crystal subpixels with color filters (e.g. 404, 405, and 406) disposed over each liquid crystal subpixel.

FIG. 11C illustrates an example checkboard pattern arrangement 1150 of first pixel RGB1 and second pixel RGB2. When second illumination zone 1007 includes approximately 50% of the first pixel and 50% of the second pixels, they may be arranged at least partially in a checkerboard pattern such as in checkerboard pattern arrangement 1150 to cover the illumination zone 1007.

Figure 12B:
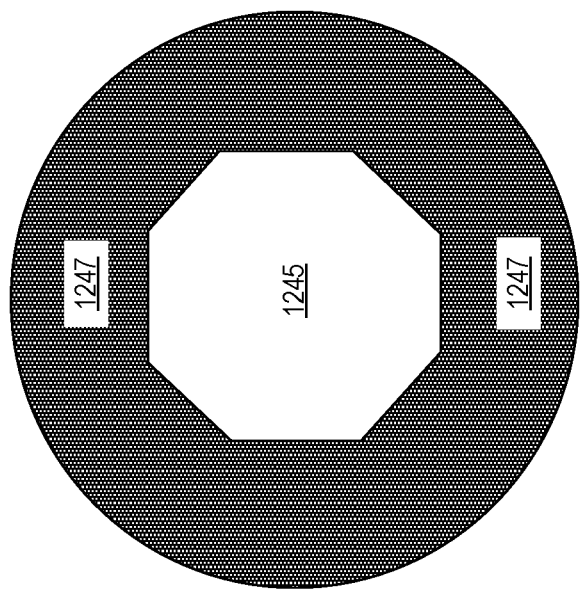
FIGS. 12A-12B illustrate example field of views corresponding to different effective focal lengths of an optical assembly, in accordance with an embodiment of the disclosure.
Figure 12A:
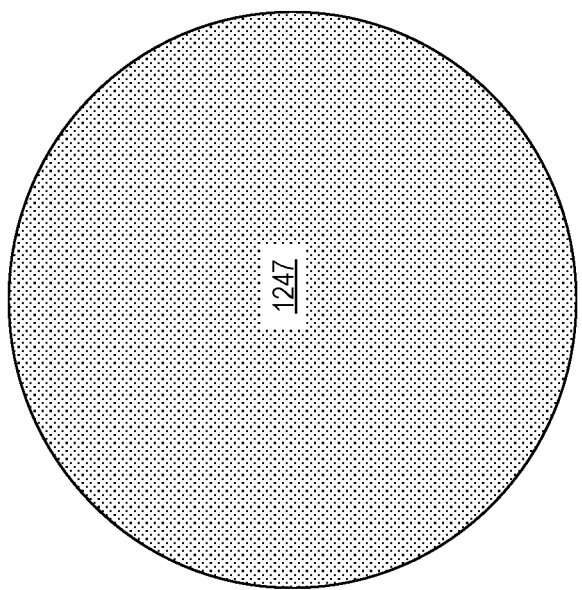

FIGS. 12A-12B illustrates example fields of view that correspond with effective focal lengths of an optical assembly, in accordance with embodiments of the disclosure. In FIG. 12A, field of view (FOV) 1247 corresponds with the effective focal length of rays 847/947. FOV 1247 may be approximately 100° and correspond with the shorter effective focal length of optical assembly 830. In FIG. 12B, field of view (FOV) 1245 corresponds with the effective focal length of rays 845/945. FOV 1245 may be approximately 50° and correspond with the longer effective focal length of optical assembly 830. The illustrated FOV 1245 corresponds to a configuration where the display providing the first and second display light is shaped as an octagon, although other display shapes (including rectangular) may also be used in accordance with embodiments of this disclosure. In this illustration, the edges of FOV 1245 are display-limited. In other embodiments, vignetting outside a clear aperture of other optical surfaces may make FOV 1245 "lens-limited" and FOV 1245 may have an elliptical shape.

Figure 13:
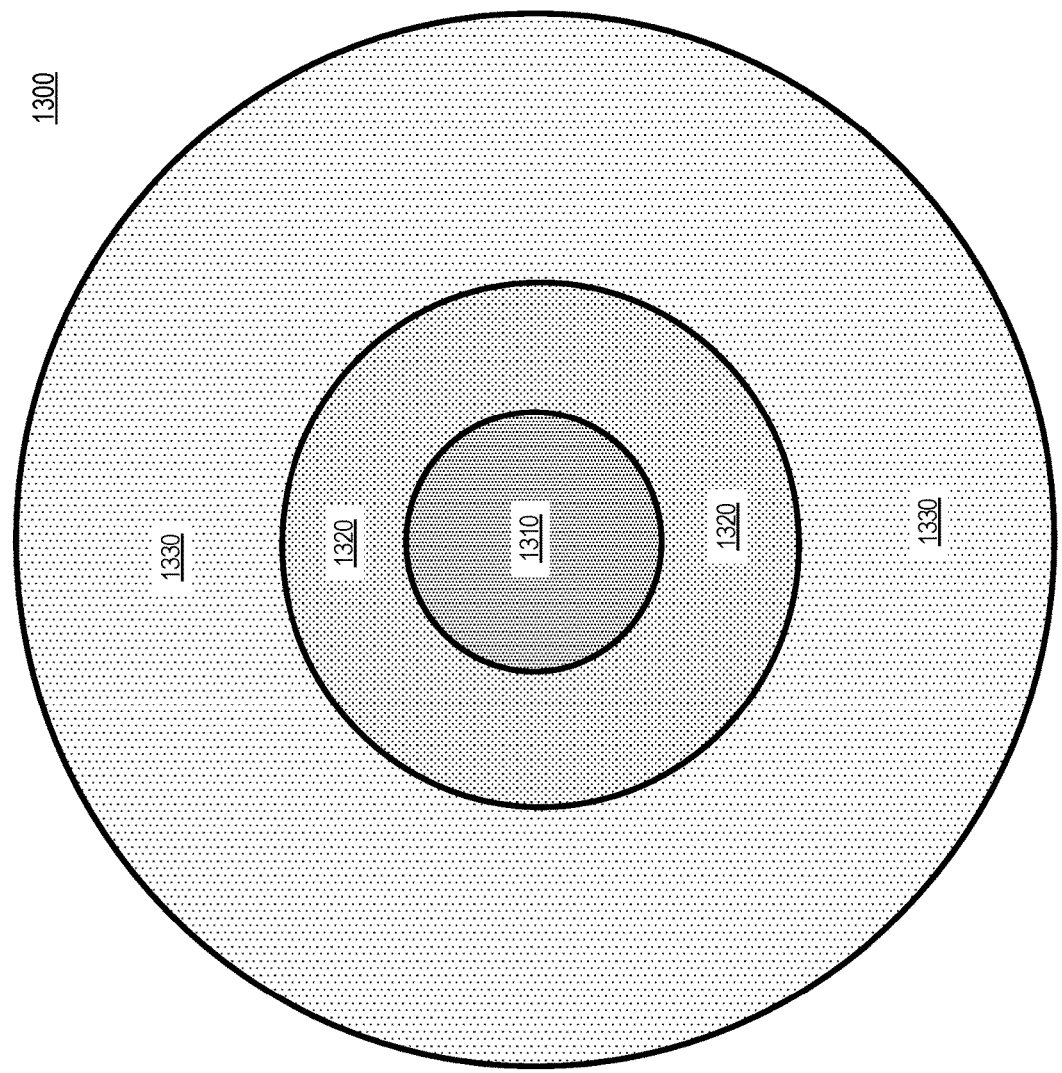
FIG. 13 illustrates an example Field of View (FOV) that includes image regions that are illuminated by the first pixels and the second pixels of the display, in accordance with embodiments of the disclosure.

FIG. 13 illustrates an example FOV 1300 that includes image regions that are illuminated by the first pixel and the second pixels of the display, in accordance with embodiments of the disclosure. When an image is presented to a user using optical assembly 830 paired with display 1000, first image region 1310 will be illuminated by first display light generated by the first pixels (e.g. a plurality of RGB1 1110) that are disposed in the first illumination zone 1003. First image region 1310 may occupy approximately 25 degrees of FOV 1300. Second image region 1320 will be illuminated by first display light from the first pixels that are disposed in second illumination zone 1007. The outside boundary of second image region 1320 may extend to approximately 50 degrees, in some embodiments.

Third image region 1330 will be illuminated by the second display light generated by the second pixels (e.g. a plurality of RGB2 1120) disposed in the second illumination zone 1007 but not by the first pixel disposed in the second illumination zone 1007 because the narrower FOV corresponding to the longer effective focal length for the first display light does not extend into image region 1330 while the wider FOV corresponding to the shorter effective focal length for the second display light does extend into image region 1330. Consequently, an RGB1 1110 pixel that is adjacent to an RGB2 1120 pixel on display 1000 may illuminate the outer boundary of image region 1320 while the adjacent RGB2 1120 pixel may illuminate the outer boundary of image region 1330. The outside boundary of third image region 1330 may extend to approximately 100 degrees FOV, in some embodiments. Although not specifically illustrated in FIG. 13, the first and second pixels disposed in transition illumination zone 1005 may contribute first and second display light to gracefully blend image regions 1320 and 1330.

Image region 1310 may be of very high resolution since it is illuminated by first illumination zone 1003 being populated 100% (or near 100%) of the first pixels and these pixels are viewed with the longer focal length (e.g. 50 mm) corresponding to rays 845/945. Since HMD users spend a high percentage of time gazing at a center of a FOV, having image region 1310 being high resolution is advantageous. Second image region 1320 may provide a lower resolution than image region 1310 since the density of RGB1 1110 pixel may be 50% in second illumination zone 1007. These pixels are also viewed with the longer focal length, but the angular resolution may degrade by a factor of two compared to image region 1310 due to the lower pixel density. Third image region 1330 is driven by RGB2 pixels at 50% density in illumination zone 1007. They are viewed with the shorter focal length (e.g. 25 mm) corresponding to rays 847/947. Angular resolution is therefore degraded another factor of two compared to 1320, or a factor of four compared to 1310. To illustrate, consider optical design 830 with focal lengths 50 mm (corresponding to rays 845/945) and 25 mm (corresponding to rays 847/947). Let us call a single group of RGB subpixels a 'white' pixels. Let the white pixel pitch on display 311 be 14.5 um. Then the resolution in image region 1310 is 1 arcmin (the angle subtended by 14.5 um over 50 mm). The resolution in image region 1320 is approximately 2 arcmin, since the effective white pixel pitch for RGB1 increases to 29 um in illumination zone 1007. Then the resolution in image region 1330 is approximately 4 arcmin (the angle subtended by 29 um over 25 mm). This degradation of resolution away from the optical axis tends to concentrate information to the center of the field, where the user's fovea is most likely to remain for most tasks.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

A computing device may include a desktop computer, a laptop computer, a tablet, a phablet, a smartphone, a feature phone, a server computer, or otherwise. A server computer may be located remotely in a data center or be stored locally.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A head mounted display (HMD) comprising:
a display having a display pixel array including:
first pixels emitting first display light; and
second pixels emitting second display light, wherein the first display light includes a first light spectrum that is different than a second light spectrum of the second display light; and
an optical assembly configured to focus the first display light and the second display light for a user of the HMD, wherein the optical assembly provides a first effective focal length to the first light spectrum of the first display light and provides a second effective focal length to the second light spectrum of the second display light, wherein the optical assembly includes:
a color-selective reflective polarizer (CSRP) configured to reflect the first light spectrum of the first display light when the first display light is oriented in a first linear polarization orientation and pass the first display light when the first display light is oriented in a second linear polarization orientation that is orthogonal to the first linear polarization orientation, wherein the CSRP is configured to pass the second light spectrum of the second display light when the second display light is in the first linear polarization orientation and in the second linear polarization orientation.

2. The HMD of claim 1, wherein the optical assembly further includes:
a color-selective partially reflective layer (CSPRL) disposed on a curved surface that imparts a first optical power in reflection to the first display light, wherein the CSPRL is configured to reflect a percentage of the first light spectrum of the first display light while passing a remaining percentage of the first light spectrum of the first display light,
and wherein the CSPRL is configured to pass substantially all of the second light spectrum of the second display light, the CSPRL disposed between the display and the CSRP.

3. The HMD of claim 2, wherein the optical assembly further includes:
a second CSPRL disposed on a second curved surface that imparts a second optical power in reflection to the second display light, wherein the second CSPRL is configured to reflect a percentage of the second light spectrum of the second display light while passing a remaining percentage of the second light spectrum of the second display light, and wherein the second CSPRL is configured to pass substantially all of the first light spectrum of the first display light; and
a reflective polarizer configured to reflect the second linear polarization orientation that is orthogonal to the first linear polarization orientation, wherein the second CSPRL is disposed between the display and the reflective polarizer.

4. The HMD of claim 3, wherein the optical assembly further includes:
a first quarter-waveplate disposed between the CSPRL and the CSRP;
a second quarter-waveplate disposed between the CSRP and the second CSPRL; and
a third quarter-waveplate disposed between the second CSPRL and the reflective polarizer.

5. The HMD of claim 4, wherein a circular polarizer is disposed between the first quarter-waveplate and the display.

6. The HMD of claim 1, wherein the display includes:
a first illumination zone populated by the first pixels that include first red-green-blue (RGB) subpixels that emit the first light spectrum of the first display light; and
a second illumination zone populated by the first pixels and the second pixels that include second RGB subpixels that emit the second light spectrum of the second display light, wherein the second illumination zone surrounds the first illumination zone.

7. The HMD of claim 6, wherein a color filter array disposed over the display pixel array includes:
a first red color filter disposed over the first red subpixels;
a second red color filter disposed over the second red subpixels;
a first green color filter disposed over the first green subpixels;
a second green color filter disposed over the second green subpixels;
a first blue color filter disposed over the first blue subpixels; and
a second blue color filter disposed over the second blue subpixels, wherein the first red color filter passes a first red band different from a second red band passed by the second red color filter, the first green color filter passes a first green band different from a second green band passed by the second green color filter, and the first blue color filter passes a first blue band different from a second blue band passed by the second blue color filter.

8. The HMD of claim 6, wherein the first pixels occupy approximately 50% of the second illumination zone, and wherein the second pixels occupy approximately 50% of the second illumination zone and none of the first illumination zone.

9. The HMD of claim 6, wherein the display includes a transition illumination zone disposed between the first illumination zone and the second illumination zone, and wherein a density of the second pixels in the transition illumination zone increases as a distance from a center of the first illumination zone increases.

10. The HMD of claim 1, wherein the second effective focal length is approximately half of the first effective focal length.

11. A head mounted display (HMD) comprising:
a display having a display pixel array including:
first pixels emitting first display light; and
second pixels emitting second display light, wherein the first display light includes a first light spectrum that is different than a second light spectrum of the second display light; and
an optical assembly including a color-selective reflective polarizer (CSRP) configured to reflect the first light spectrum of the first display light when the first display light is oriented in a first linear polarization orientation and pass the first display light when the first display light is oriented in a second linear polarization orientation that is orthogonal to the first linear polarization orientation, wherein the CSRP is configured to pass the second light spectrum of the second display light when the second display light is in the first linear polarization orientation and in the second linear polarization orientation.

* * * * *